(12) United States Patent
Burg

(10) Patent No.: US 6,948,439 B2
(45) Date of Patent: Sep. 27, 2005

(54) SURFACE EFFECT SHIP IMPROVEMENTS

(76) Inventor: Donald E. Burg, 15840 SW. 84th Ave., Miami, FL (US) 33157

( * ) Notice: Subject to any disclaimer, the term of this patent is extended or adjusted under 35 U.S.C. 154(b) by 0 days.

(21) Appl. No.: 10/784,443

(22) Filed: Feb. 23, 2004

(65) Prior Publication Data
US 2004/0163580 A1 Aug. 26, 2004

Related U.S. Application Data

(63) Continuation-in-part of application No. 10/274,654, filed on Oct. 21, 2002, now abandoned, and a continuation-in-part of application No. 10/777,426, filed on Feb. 11, 2004, and a continuation-in-part of application No. 10/337,490, filed on Jan. 7, 2003, and a continuation-in-part of application No. 10/286,712, filed on Nov. 1, 2002, now abandoned.

(51) Int. Cl.$^7$ ................................................. B63B 1/38
(52) U.S. Cl. ...................... 114/67 A; 180/126
(58) Field of Search ............................ 114/67 A, 56.1, 114/288, 289, 290; 180/126, 127, 128

(56) References Cited

U.S. PATENT DOCUMENTS

| | | | | | |
|---|---|---|---|---|---|
| 4,489,667 A | * | 12/1984 | Moore et al. | ............. | 114/67 A |
| 4,494,473 A | * | 1/1985 | Simpson | ................... | 114/67 A |
| 4,615,407 A | * | 10/1986 | Wilson et al. | ............... | 180/128 |
| 4,646,866 A | * | 3/1987 | Bertrand et al. | ............ | 180/126 |
| 4,739,719 A | * | 4/1988 | Burg | ........................ | 114/67 A |
| 4,890,564 A | * | 1/1990 | Burg | ........................ | 114/67 A |
| 5,000,107 A | * | 3/1991 | Burg | ........................ | 114/67 A |
| 5,176,095 A | * | 1/1993 | Burg | ........................ | 114/67 A |
| 5,415,120 A | * | 5/1995 | Burg | ........................ | 114/67 A |
| 5,746,146 A | * | 5/1998 | Bixel, Jr. | .................. | 114/67 A |
| 5,839,384 A | * | 11/1998 | Burg | ........................ | 114/67 A |

* cited by examiner

Primary Examiner—Lars A. Olson

(57) ABSTRACT

Presented is an improved Surface Effect Ship (SES) that offers the high efficiencies of the pressurized air cushion supported generic flexible bow and stern seal SES but without the generic SES's shortcomings that are due largely to its 80 percent total hull width flexible bow and stern seals. This is accomplished in the instant invention by use of forward extending rigid bow members positioned both sides of a pressurized hull supporting gas cushion where the width of the sidehulls make up a majority of the width of the instant invention improved surface effect ship with the remainder, less than 35 percent of vessel width normally, made up by a gas cushion forward seal member disposed between the bow members. Gas cushions may extend forward into undersides of the sidehull bow members to further reduce wetted area resistance. Longitudinally oriented fluid fences may be incorporated to at least partially separate portions of the gas cushion and thereby dampen pressure perturbations in the gas cushion(s). A third bow member may be utilized between port and starboard sidehulls.

79 Claims, 6 Drawing Sheets

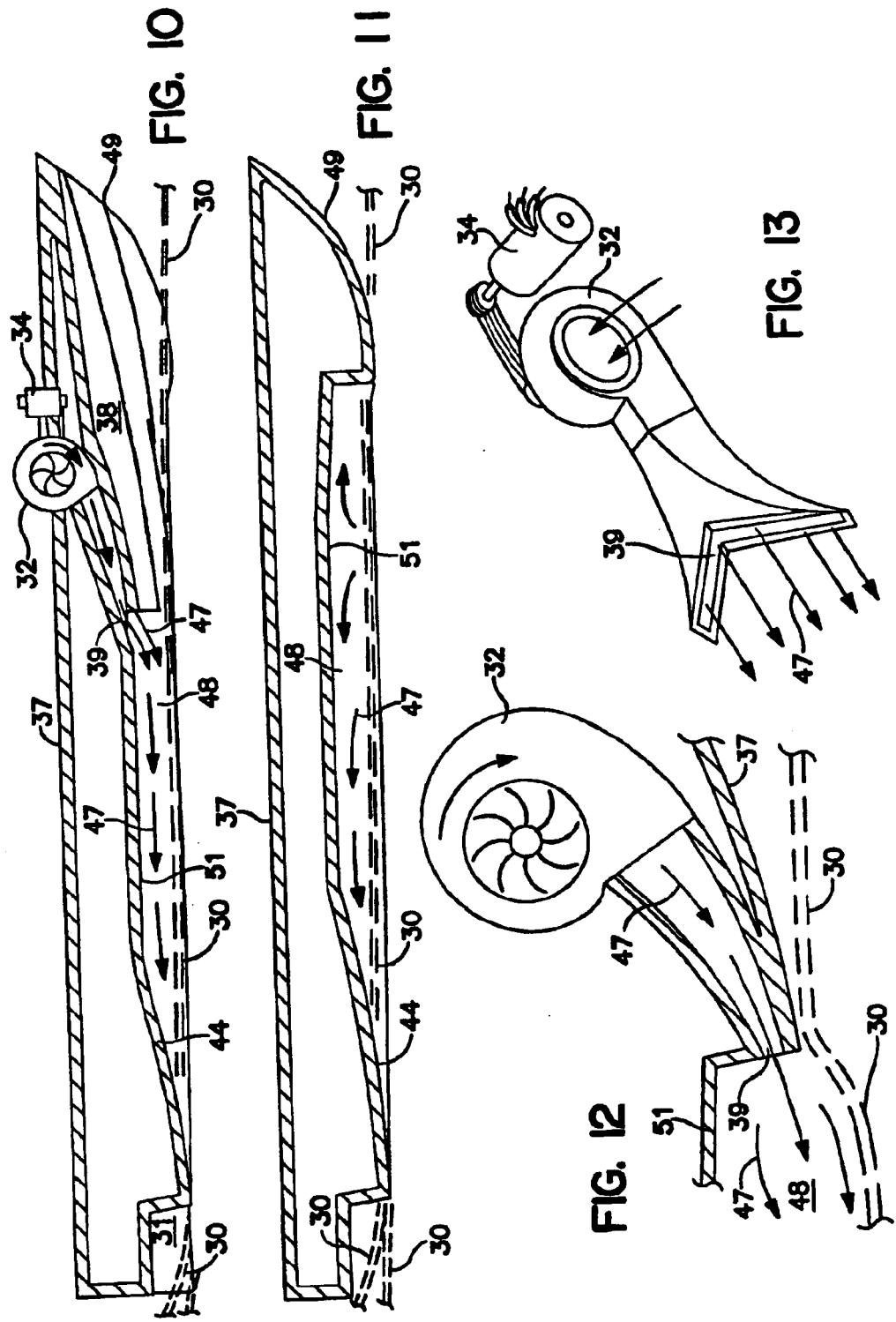

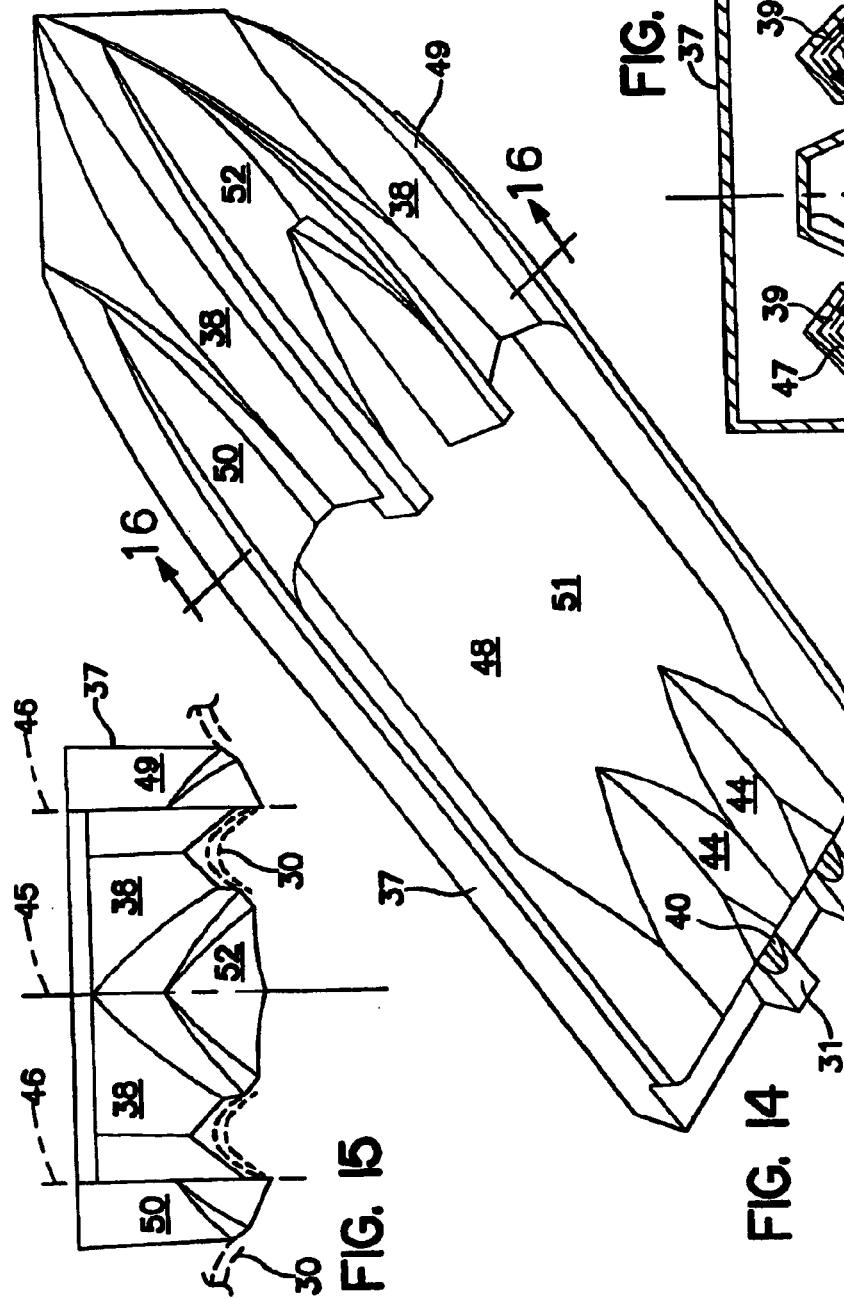

SURFACE EFFECT SHIP IMPROVEMENTS

CROSS REFERENCE TO OTHER APPLICATIONS

This application is a continuation-in-part to U.S. application Ser. No. 10/274,654 filed Oct. 21, 2002 now abandoned; Ser. No. 10/286,712 filed Nov. 1, 2002 now abandoned; Ser. No. 10/337,490 filed Jan. 7, 2003; and Ser. No. 10/777,426, filed Feb. 11, 2004.

BACKGROUND OF THE INVENTION

Marine Surface Effect Ships (SES) in their generic form have a upper hull that is rather flat on its underside with downward extending asymmetrical catamaran sidehull portions either side. These asymmetrical sidehull portions are connected transversely fore and aft by flexible seals. The boundary of the space thus formed is pressurized with air supplied by powered blowers to thereby form a deep air layer between the hull and the water's surface. This results in a vessel that has little water contact and is therefore quite efficient at high speeds in calm water.

Major shortcomings of the generic SES are that: 1) The wide barn door effect of the flexible bow seal contributes to a drastic increase in resistance and poor sea keeping characteristics when moderate to high seas are encountered, 2) The flexible bow seal allows waves to enter and upset the stability of the supporting gas cushion that is really a huge gas spring. This results in a very uncomfortable 2–4 cycle per second oscillation that is commonly known as the SES "cobblestone" ride effect, and 3) The large full span flexible bow and stern seals are rather expensive and high maintenance.

Applicant has successfully addressed the shortcomings of the generic SES with his patented SEACOASTER Surface Effect CATamaran (SECAT) inventions. SEACOASTER has fine entry bows on long and slender sidehulls with gas cushion recesses built into their undersides. Blower pressurized air is supplied to the two recesses thereby essentially forming two parallel surface effect ships mounted to a common hull structure. The shortcomings of the generic SES are avoided since there are no high cost and maintenance flexible seals and there is no gas cushion between the sidehulls. The fine entry bows of the SEACOASTER's sidehulls provide an excellent ride in rough seas and there is no "cobblestone" ride as is experienced with the generic SES.

However, compared to a generic SES of similar size, the SEACOASTER inventive hull has two shortcomings: 1) It has about 30 percent less air cushion surface area and hence requires a higher cushion pressure due to the non-pressurized area between its sidehulls and 2) It has more wetted area since it has four sidewalls, one on each side of each of its air cushions, while the generic SES has only two sidewalls. Even with these relatively minor shortcomings, the SEACOASTER is proving to be a very successful concept.

The instant invention proposed herein addresses the minor shortcomings of the SEACOASTER concept while still designing out the major shortcomings of the generic SES. This will be understood upon review of the following sections.

SUMMARY OF THE INVENTION

The primary object of the instant invention is to provide a very efficient and sea kindly marine surface effect ship that is partially supported by artificially pressurized gas cushion(s).

It is a further object of the invention that it include port and starboard sidehulls and bow members.

It is related object of the invention that a gas cushion forward seal member(s) be disposed in a general transverse direction to thereby form a portion of a gas seal for the artificially pressurized gas cushion(s).

It is a directly related object of the invention that the gas cushion forward seal member(s) extend at least a majority of the distance between inboard portions of the port and starboard bow members.

It is a directly related object of the invention that the gas cushion forward seal member(s), as seen in a vertical transverse plane of the improved surface effect ship, are angled to horizontal over a majority of their width.

It is a further related object of the invention that a gas cushion forward seal member(s), as seen in a vertical transverse plane of the improved surface effect ship, be at least in part of an inverted-V shape.

It is another object of the invention that a powered blower discharge into a gas cushion be located proximal an aft end of the gas cushion forward seal member(s).

It is yet another object of the invention that a powered blower discharge be accelerated so that the dynamic gas pressure is proximal to or higher than the pressure in the gas cushion before discharge into the gas cushion.

It is another object of the invention that water contacting portions of the port and starboard bow members extend, as seen when the improved surface effect ship is moving forward at high speed in a calm sea, forward of an average of longitudinal positions, as seen in longitudinal vertical planes of the improved surface effect ship, of forward water contacting portions of a gas cushion forward seal member by at least ten percent of a waterline length of the improved surface effect ship.

A directly related object of the invention is that it be defined as running at a bow up trim angle when moving forward at high speed in a calm sea.

It is another object of the invention that, when the invention is moving forward, high speed is defined as 15 knots or more.

Another directly related object of the invention is that the bow up trim angle be less than five degrees with an optimum angle being less than two and one half degrees.

A directly related object of the invention is that water contacting portions of said port and starboard bow members extend, as seen when the improved surface effect ship is moving forward at high speed in a calm sea, forward of an average of longitudinal positions, as seen in longitudinal vertical planes of the enhanced surface effect ship, of forward water contacting portions of a gas cushion forward seal member by at least fifteen percent of a waterline length of the improved surface effect ship.

A further related object of the invention is that the port and starboard bow members extend, as seen when the improved surface effect ship is moving forward at high speed in a calm sea, forward of an average of longitudinal positions, as seen in longitudinal vertical planes of the improved surface effect ship, of forward water contacting portions of a gas cushion forward seal member by at least twenty percent of a waterline length of the enhanced surface effect ship.

Yet still another related object of the invention is that water contacting portions of said port and starboard bow members extend, as seen when the improved surface effect ship is moving forward at high speed in a calm sea, forward of an average of longitudinal positions, as seen in longitudinal vertical planes of the improved surface effect ship, of forward water contacting portions of a gas cushion forward seal member by at least twenty-five percent of a waterline length of the improved surface effect ship.

Another object of the invention is that forward water contacting portions of said port and starboard bow members can further comprise artificially pressurized gas cushion portions disposed in their undersides.

A directly related object of the invention is that the artificially pressurized gas cushion portions disposed in the undersides of the port and starboard bow members extend, as seen when the improved surface effect ship is moving forward at high speed in a calm sea, forward of an average of longitudinal positions, as seen in longitudinal vertical planes of the improved surface effect ship, of forward water contacting portions of a gas cushion forward seal member.

Yet another related object of the invention is that the artificially pressurized gas cushion portions disposed in the undersides of the port and starboard bow members extend, as seen when the improved surface effect ship is moving forward at high speed in a calm sea, forward of an average of longitudinal positions, as seen in longitudinal vertical planes of the improved surface effect ship, of forward water contacting portions of a gas cushion forward seal member by at least five percent of a waterline length of the improved surface effect ship.

A further related object of the invention is that the artificially pressurized gas cushion portions disposed in the undersides of the port and starboard bow members extend, as seen when the improved surface effect ship is moving forward at high speed in a calm sea, forward of an average of longitudinal positions, as seen in longitudinal vertical planes of the improved surface effect ship, of forward water contacting portions of a gas cushion forward seal member by at least ten percent of a waterline length of the improved surface effect ship.

Still another object of the invention is that the gas cushion portions disposed in the undersides of the port and starboard bow members diverge either side of vertical sidehull longitudinal planes going aft from their forward portions.

A directly related object of the invention is that the vertical longitudinal planes are vertical longitudinal centerline planes of the port and starboard sidehulls.

A further object of the invention is that water contacting portions of gas cushion forward seal member(s) disposed between the port and starboard sidehulls extends over less than twenty percent of an overall width of the improved surface effect ship proximal the gas cushion forward seal member(s).

A related object of the invention is that water contacting portions of said gas cushion forward seal member(s) disposed between the port and starboard bow members extends over less than twenty-five percent of an overall width of the improved surface effect ship proximal the gas cushion forward seal member(s).

Yet another related object of the invention is that water contacting portions of said gas cushion forward seal member(s) disposed between the port and starboard bow members extends over less than thirty percent of an overall width of the improved surface effect ship proximal the gas cushion seal member(s).

Still another related object of the invention is that water contacting portions of a gas cushion forward seal member(s) disposed between the port and starboard bow members extends over less than thirty-five percent of an overall width of the improved surface effect ship proximal the gas cushion forward seal member(s).

Yet another related object of the invention is that water contacting portions of said gas cushion forward seal member(s) disposed between the port and starboard bow members extends over less than forty percent of an overall width of the improved surface effect ship proximal the gas cushion forward seal member(s).

Another related object of the invention is that water contacting portions of said gas cushion forward seal member disposed between the port and starboard bow members extends over less than fifty percent of an overall width of the improved surface effect ship proximal the gas cushion forward seal member(s).

Another important object of the invention is that inboard portions of the port and starboard sidehulls are truncated over a portion of their length aft of their bow portions.

A related object of the invention is that truncated aft extending portions of said port and starboard sidehulls extend downward from an upper portion of a gas cushion recess to thereby form, at least partially, fluid fences that at least partially separate portions of the artificially pressurized gas cushion(s).

A directly related object of the invention is that, when the improved surface effect ship is moving forward at high speed in a calm sea, said fluid fences of said port and starboard sidehulls are not in contact with a water surface over a majority of their length.

A further object of the invention is that a gas cushion aft seal, as seen in a vertical transverse plane of the improved surface effect ship, comprises at least two inverted-V shaped portions.

A further object of the invention is that the port and starboard bow members diverge either side of vertical sidehull longitudinal planes going aft from forward portions of their bows.

A directly related object of the invention is that the vertical sidehull longitudinal planes are vertical sidehull centerline planes of the port and starboard sidehulls.

A further object of the invention is that forward water contacting portions of said port and starboard bow members diverge either side of their water contacting bow portions such that their measured inboard and outboard divergence either side of their water contacting bow portions is numerically within fifty percent of each other.

Yet a further object of the invention is that a center hull may be disposed between the port and starboard sidehulls.

A directly related object of the invention is that said center hull may be truncated over its aft portion.

A further object of the invention is that gas cushion forward seals may be disposed between the center hull and sidehulls.

Still another object of the preferred embodiment of the invention is that the gas discharge into the gas cushions be made up of at least fifty percent (50%) dynamic pressure.

A directly related object of the preferred embodiment of the invention is that the gas discharge into the gas cushions be made up of at least seventy-five percent (75%) dynamic pressure.

Yet another directly related object of the preferred embodiment of the invention is that the gas discharge into the gas cushions be made up of at least ninety percent (90%) dynamic pressure.

BRIEF DESCRIPTION OF THE DRAWINGS

FIG. 10 presents a cross sectional view, as taken through line 10—10 of FIG. 2, that shows a section of hull through a vertical centerline plane of the hull. Note that the discharge of the gas pressurizing blower is discharged aft and downward here to aid in sealing gas cushion pressurized gas from escaping forward.

FIG. 11 is a cross sectional view, as taken through line 11—11 of FIG. 2, that shows part of an air cushion recess in way of a sidehull's vertical centerline plane.

FIG. 12 presents an enlarged partial cross section, as taken through line 12—12 of FIG. 2 that shows how the blower discharge gas is accelerated to thereby increase its dynamic pressure component. Note how the waterline is depressed by the high energy of the gas discharging into the gas cushion.

FIG. 13 presents a 3 dimensional look at a typical blower as it would be discharging through an aft portion of a gas cushion forward gas seal member. Note how the gas has been accelerated to increase its dynamic pressure component by necking down the discharge.

FIG. 14 gives a slight variation of the instant invention where a center bow member has been installed between sidehulls. There are two forward gas cushion seal members here. One is between each of the sidehull bows and the center bow.

FIG. 15 presents a bow view of the instant invention improved surface effect ship of claim 14.

FIG. 16 is a cross section, as taken through line 16—16 of FIG. 14, that shows the blower discharges disposed in the forward gas cushion seals either side of the center bow member.

FIG. 12 gives another half-breadth cross section, as taken through line 12—12 of FIG. 2, that illustrates a typical midship section. Note the fluid fence that is vertically oriented here.

DETAILED DESCRIPTION

Figure 1:
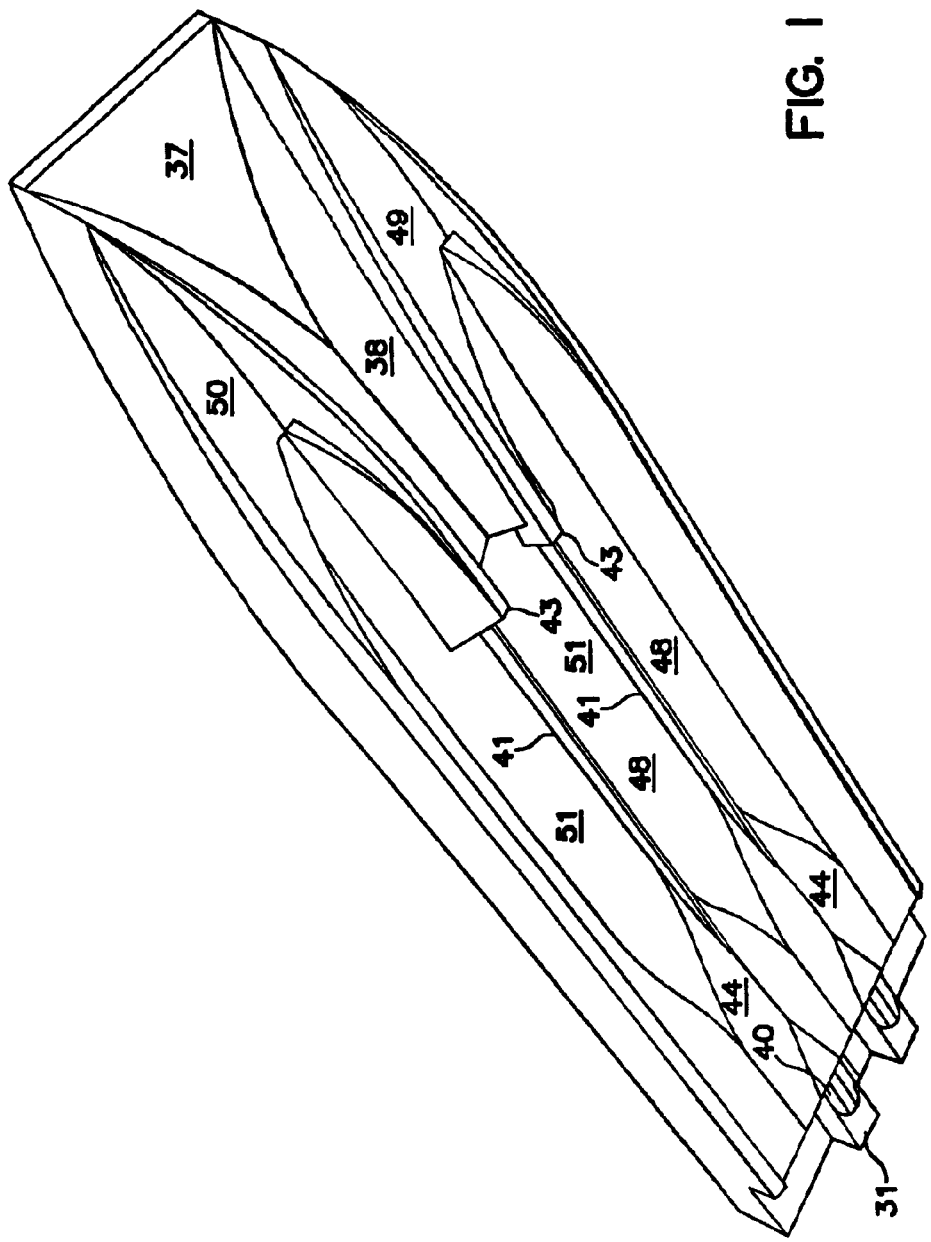
FIG. 1 presents an underside 3D perspective of a preferred embodiment of the instant invention improved surface effect ship.

FIG. 1 presents an underside 3D perspective of the enhanced surface effect ship 37 to the instant invention. Items to note are forward extending port bow member 49 and starboard bow 50. These bow members extend forward of a gas cushion forward seal member 38. In this case the gas cushion forward seal member 38 has the preferred inverted-V shape. The inverted-V shape provides good rough sea ride qualities and also presents a shape that concentrates the water coming off of the bows 49, 50 to most effectively create a gas sealing effect. Artificially pressurized gas is supplied to the gas cushion through gas discharge openings in the aft end of the gas cushion forward seal member 38 in this preferred embodiment of the invention. Other means of supplying pressurized gas to the gas cushion 48 can be employed and are considered to be within the scope of the instant invention.

The pressurized gas is retained in the gas cushion 48 by sidehulls 42, bow members 49, 50, inboard sidewalls 43, gas cushion forward seal member 38, gas cushion recess top 51, stern seal 44 and, of course, the water surface. Fluid fences 41 are used here to restrict movement of fluids from one portion of the gas cushion 48 to another. It is desirable that these fluid fences 41 do not make water contact during forward high speed operation in order to reduce wetted area frictional resistance. Thrust is provided by propulsors 31. Some optional propulsor water inlets 40 are shown here for illustrative purposes.

Figure 2:
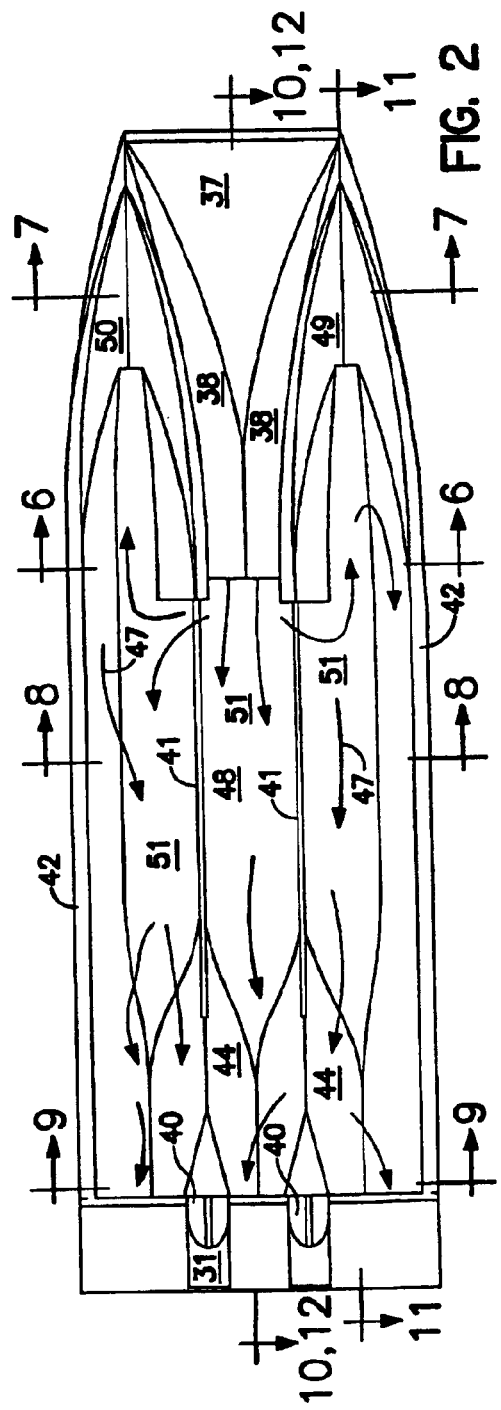
FIG. 2 is an underside plan view of the improved surface effect ship of FIG. 1.

FIG. 2 gives a bottom plan view of the instant invention improved surface effect ship 37. Items shown are similar to those given in FIG. 1 with the addition of gas flow arrows 47 that have been added. It shows part of the gas cushion forward seal member 38 disposed between the port and starboard bow members. Note how far the water contacting portions a bow member 49 extends forward of the water contacting portion of the gas cushion forward seal 38. This is an important consideration to the instant invention enhanced surface effect ship 37 since it: 1) Provides pitch stability forward of the gas cushion forward seal and 2) Allows the sidehulls to develop at least near full width where the gas cushion forward seal is located. Some definitions of the desired ranges of extension of water contacting portions of the bow members forward of the water contacting portions of the gas cushion forward seal are given in a preceding section titled SUMMARY OF THE INVENTION.

Figure 3:
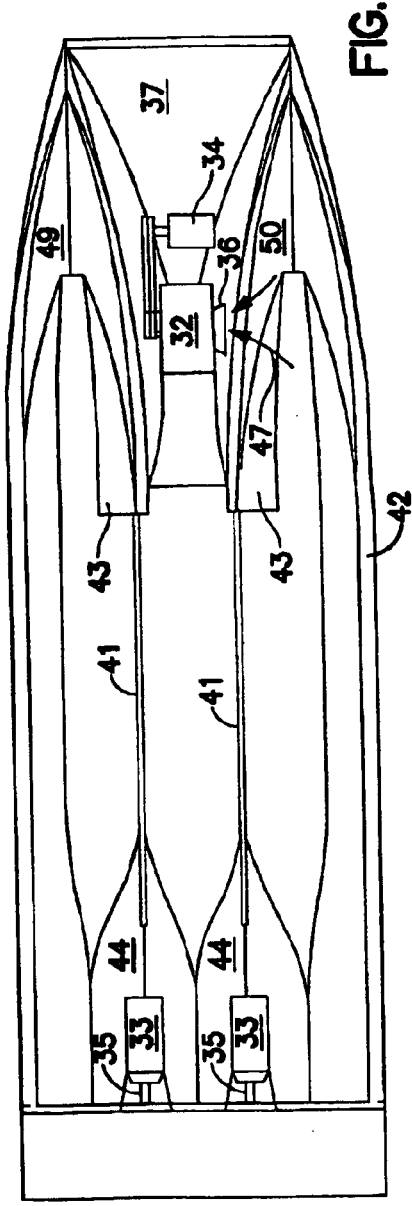
FIG. 3 is a topside plan view of the improved surface effect ship of FIG. 1 with the main deck removed to show machinery arrangements.

FIG. 3 presents a topside plan view with the primary deck portion removed for illustrative purposes. This shows typical installation of some of the critical machinery elements. Included are propulsor drive shafts 35 and propulsor engines 33. A typical blower 32 is driven by blower drive engine 34.

Figure 4:
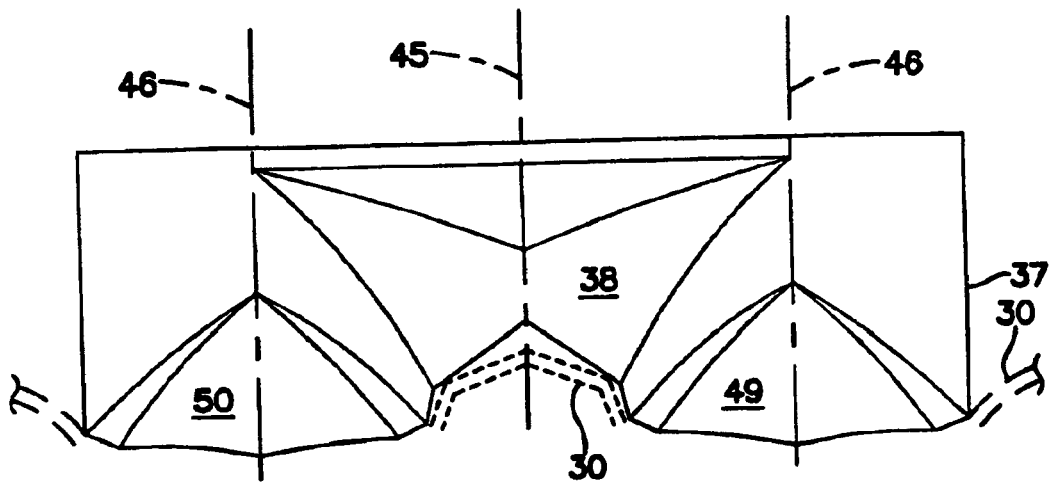
FIG. 4 gives a bow view of the preferred embodiment of the instant invention improved surface effect ship.

FIG. 4 presents a bow view of the instant invention improved surface effect ship 37. Some items shown include a vertical centerline plane 45 and sidehull vertical centerline planes 46 of the vessel. It is important to note the width of the lower water contacting portion of the gas cushion forward seal 38. It is about 25 percent of the total width of the instant invention improved surface effect ship 37 proximal the gas cushion forward seal 38 here which is in a desired range. Some definitions of the desired limits on percentage of gas cushion forward seal 38 width for the instant invention improved surface effect ship are given in a preceding section titled SUMMARY OF THE INVENTION. The percentage of total vessel width of the moveable bow seal of a generic SES is more like 80 percent. The very wide moveable bow seal of the generic SES makes for an effect like pushing a barn door sideways over the surface of the water. While not a problem in calm water, the barn door effect of the generic SES's moveable bow seal results in tremendous increases in resistance and a severe degradation in ride quality as sea state increases. This is one of the major shortcomings that the instant invention improved surface effect ship avoids since its gas cushion forward seal 38 is much narrower and also is primarily above a calm sea surface. Note that the waterline 30 between the sidehull bows 49, 50 here are raised as formed by the wave action originating from the inboard sides of the sidehull bows 49, 50. This aids in the sealing of the pressurized gas inside of the gas cushion at of the gas cushion forward seal 38.

Figure 5:
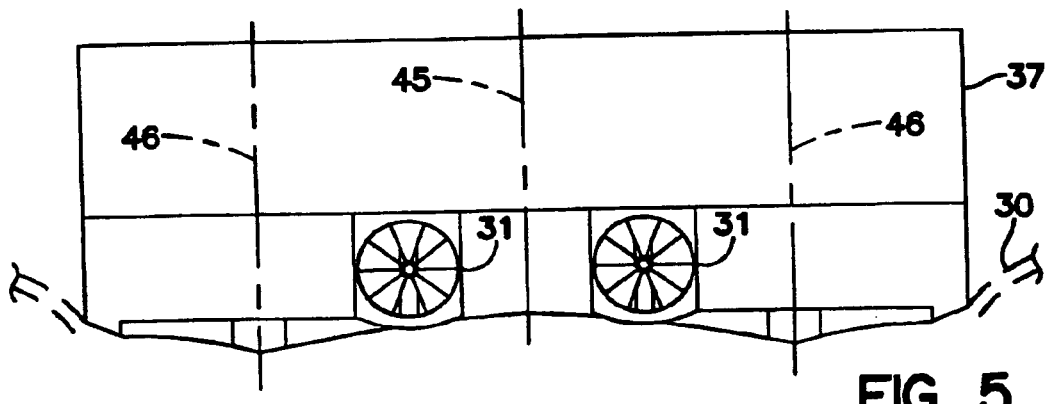
FIG. 5 is a stern view of the instant invention improved surface effect ship.

FIG. 5 shows a stern view that illustrates preferred locations of propulsors 31. Note the relatively flat shape of the gas cushion aft seal 44 which is the preferred design for low drag and good gas sealing.

Figure 6:
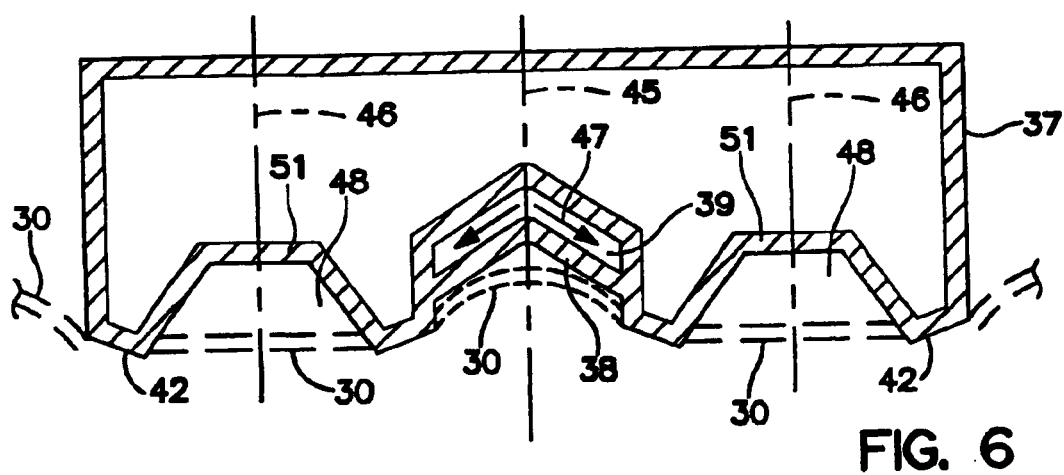
FIG. 6 presents an external side view of the instant invention improved surface effect ship.

FIG. 6 presents a vertical plane cross section, as taken through line 6—6 of FIG. 2, that shows the shape and structure of the instant invention improved surface effect ship 37 near and aft portion of the gas cushion forward seal 38. Note that this shows location of the blower discharge opening 39 just upstream of the gas cushion. The waterlines 30 shown here give an idea of the sealing effect of the water below the gas cushion forward seal 38. The waterlines 30 also show the desired level of the water below the gas cushions 48 here.

Figure 7:
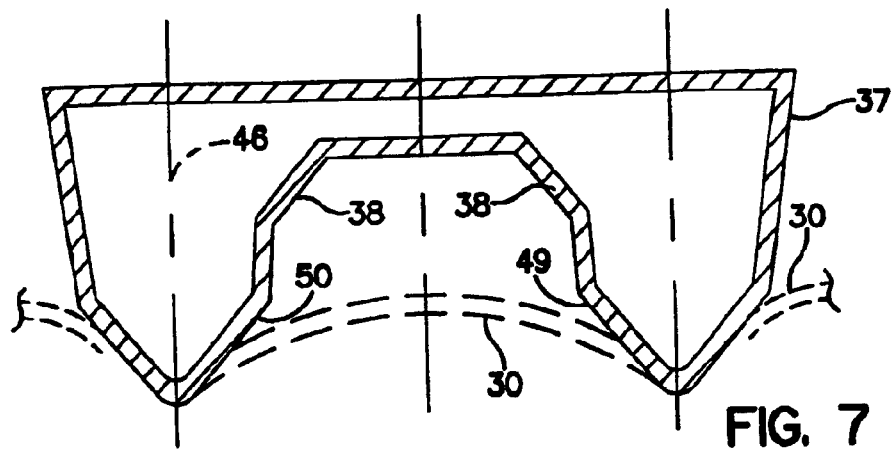
FIG. 7 is a cross-sectional view, as taken through line 7—7 of FIG. 2, that shows a section of the improved surface effect ship forward of the gas cushion(s).

FIG. 7 is a cross section, as taken through line 7—7 of FIG. 2, that shows shape of sidehull bows 49, 50 forward of the gas cushions.

Figure 8:
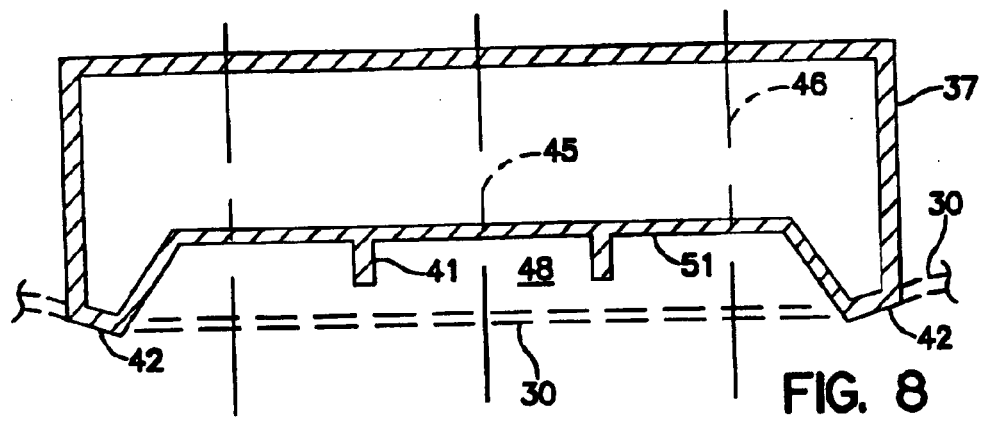
FIG. 8 presents a cross-sectional view, as taken through line 8—8 of FIG. 2. This shows fluid fences that at least partially separate portions of the gas cushion(s).

FIG. 8 presents a typical midship cross section, as taken through line 8—8 of FIG. 2, that shows a full span gas cushion that extends between the sidehulls 42. Note that the waterline 30 below the gas cushion 48 does not touch the fluid fences 41 in this depiction that is for operation in a calm sea.

Figure 9:
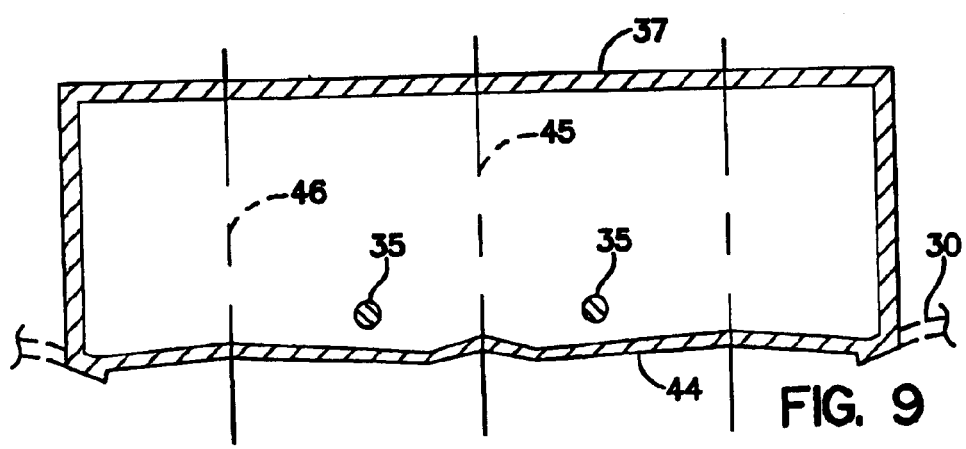
FIG. 9 gives a centerline cross-section, as taken through line 9—9 of FIG. 2, that shows a transverse section of the gas cushion aft seal just forward of a transom.

FIG. 9 gives a vertical plane cross section, as taken through line 9—9 of FIG. 2, that shows a preferred shape of the gas cushion stern seal 44 which is near flat at this just forward of the transom section. Propulsor drive shafts 35 as intersected are shown here.

FIG. 10 presents a centerline plane cross sectional view, as taken through line 10—10 of FIG. 2 that shows a powered blower 32 driven by a blower motor 34. The discharge of the blower is at the aft end of the gas cushion forward seal 38 here. This approach allows the gas discharge through blower discharge opening 39 to help seal gas from leaking from the pressurized gas cushion 48.

In order to make definitions clear, it is stated here that the claims are drawn based on the instant invention improved surface effect ship 37 running forward at high speed in calm seas with the gas cushion(s) pressurized. It is a preferred embodiment of the instant invention surface effect ship that it run forward at a bow up trim angle of less than five degrees with less than two and one-half degrees preferred. High speed when traveling forward is defined as 15 knots or greater.

FIG. 11 gives a view taken through a vertical sidehull plane, as taken through line 11—11 of FIG. 2, that shows the preferred shape of the gas cushion 48 as it extends from forward in a sidehull bow 49 aft to a gas cushion aft seal 44.

FIG. 12 presents a partial cross section, as taken through line 12—12 of FIG. 2, that shows how the gas discharge from a powered blower 32 can aid in the sealing of the gas cushion 48. Note that the high velocity of the gas discharge from the blower discharge opening 39 normally depresses the water as is shown by the depression of the waterline 30 aft of the gas discharge into the gas cushion 48. Importantly, the sum of the static and dynamic heads at the discharge opening 39, at least in the preferred embodiment of the instant invention, must equal or exceed the gas pressure inside the gas cushion 48.

FIG. 13 is a 3D illustration of a blower system to the preferred embodiment of the instant invention improved surface effect ship. Note the converging design of the discharge 39 which adds to acceleration of the gas. It is to be noted that normal velocity of the gas discharge from a blower used in these craft would be about 5,000 feet per minute. By having the converging or nozzle effect, the gas is accelerated to about 25,000 feet per minute (about half of the speed of sound at these conditions). This increases dynamic pressure in the discharge gas by about 25 times to bring it up to gas cushion pressure so that an effective forward gas seal can be realized. For purposes of this application, discharge velocities of at least 15,000, 20,000, 25,000, or 30,000 feet per minute are considered feasible with state of the art blower equipment. These values are well below the speed of sound so no sonic shock effects are encountered.

Converting the preceding velocities to dynamic pressures, the standard blower discharge velocity of 5,000 feet per minute (fpm) calculates out to about 9 pounds per square foot (psf) of dynamic pressure. Increasing the velocity to 10,000 fpm equates to 35 psf, 15,000 fpm to 78 psf, 20,000 fpm to 138 psf, 25,000 fpm to 216 psf, and 30,000 fpm to 310 psf A typical 50 foot instant invention or a more standard fully materially sealed SES would have maximum gas cushion pressures of about 70 psf, a 100 footer about 140 psf, and a 200 footer about 280 psf These are really rather low pressures when one realizes that 144 psf is only one pound per square inch (psi).

A standard SES gas cushion forward moveable seal acts upon the water's surface and not much gas escapes under the forward seal when moving forward at high speed in a calm sea. Therefore, a normal blower discharge velocity of about 5,000 fpm that calculates to 9 psf of dynamic pressure means that the balance of pressure to equal or exceed the gas cushion pressure is made up of static pressure.

However, with the instant invention's forward seal that is above the water's surface in such a condition there is an air gap under such a forward seal. Therefore, in the case of the instant invention, the dynamic pressure must be high enough to seal in the gas cushion pressure. Taking the 120 footer size vessel with its 140 psf cushion pressure as an example, the dynamic pressure should, in the preferred embodiment, be above that value and ideally about 140–160 psf. This equates to a dynamic velocity of about 20,850 fpm. What is happening is that the dynamic pressure is converted to static pressure such that the total pressure, a sum of static and dynamic pressure, equals or exceeds the gas cushion pressure proximal the forward seal discharge and hence the instant invention's unique forward gas sealing abilities. This compares to the normal blower discharge dynamic pressure for a 120 foot SES of about 140 psf static pressure and 9 psf dynamic pressure which means a total pressure of 140 psf or so. It is therefore an object of this invention that the discharge pressure into its gas cushion(s) from the forward seal(s) be made up more of dynamic pressure than static pressure. Values of 60 percent or greater, 75 percent or greater, or 90 percent or greater ratios of dynamic pressure to total pressure at the point of discharge into the gas cushion(s) are considered to be the preferred range of values for the instant invention. This compares to, in the case of our 120 foot SES example, the dynamic pressure being only about 6–8 percent of total pressure where the pressurized gas discharges into its gas cushion(s).

It is also to be realized that, while the use of blower discharge gas to help seal the forward end of the gas cushion is the preferred embodiment of the instant invention, it may not be necessary to have the blower discharge as part of the gas cushion forward seal. This is the case if the waves coming from the bows create enough of a barrier to prevent pressurized gas from leaking forward past the gas cushion forward seal(s) at unacceptably high rates.

FIG. 14 presents a simple variation, in a 3D underside perspective, of the instant invention improved surface effect ship. There is a center bow member 52 and two partial sidehull bows 49, 50. Two gas cushion forward seal members 38 extend between the sidehulls 49, 50 and the center bow member 52. There would, in the embodiment shown here, be blowers discharging through both forward seal members 38. Note that the optional gas fences have been eliminated. While desirable, it not necessary to incorporate the gas fences in any of the instant invention improved surface effect ships.

FIG. 15 presents a bow view of the instant invention improved surface effect ship 37 shown in FIG. 14. Note the two gas cushion forward seals 38 here.

FIG. 16 is a cross section, taken through line 16—16 of FIG. 14, showing the hull shape in way of an aft end of the gas cushion forward seals 38 and gas flow arrows 39.

While the invention has been described in connection with a preferred and several alternative embodiments, it will be understood that there is no intention to thereby limit the invention. On the contrary, there is intended to be covered all alternatives, modifications, and equivalents as may be included within the spirit and scope of the invention as defined by the appended claims, which are the sole definition of the invention.

What I claim is:

1. In an improved surface effect ship wherein said improved surface effect ship includes a port sidehull having a port bow member and a starboard sidehull having a starboard bow member and is supported upon a water surface in part by at least one artificially pressurized gas cushion, the improvement comprising:

water contacting portions of said port and starboard bow members extend, as seen when the improved surface effect ship is moving forward at high speed in a calm sea with its gas cushion pressurized, forward of an average of longitudinal positions of forward water contacting portions of a gas cushion forward seal member by at least five percent of a waterline length of the improved surface effect ship and wherein said gas cushion forward seal member is, at least primarily, of a non-moveable, in relation to a hull the improved surface effect ship, structure and disposed, at least in part, between the port and starboard bow members and wherein inboard sidewalls of said port and starboard sidehulls are at least partially truncated going aft of the port and starboard bow members to thereby reduce wetted area of the improved surface effect ship.

2. The improved surface effect ship of claim 1 wherein the gas cushion forward seal member is angled over a majority of its width as seen in vertical transverse planes of the improved surface effect ship taken proximal an aft lower end of the gas cushion forward seal member.

3. The improved surface effect ship of claim 1 wherein the gas cushion forward seal member is at least in part of an inverted-V shape as seen in vertical transverse planes of the improved surface effect ship taken proximal an aft lower end of the gas cushion forward seal member.

4. The improved surface effect ship of claim 1 wherein water contacting portions of said port and starboard bow members extend forward of an average of longitudinal positions of water contacting portions of the gas cushion forward seal member by at least ten percent of a waterline length of the improved surface effect ship.

5. The improved surface effect ship of claim 1 wherein water contacting portions of said port and starboard bow members extend forward of an average of longitudinal positions of water contacting portions of the gas cushion forward seal member by at least fifteen percent of a waterline length of the improved surface effect ship.

6. The improved surface effect ship of claim 1 wherein water contacting portions of said port and starboard bow members extend forward of an average of longitudinal positions of water contacting portions of the gas cushion forward seal member by at least twenty percent of a waterline length of the improved surface effect ship.

7. The improved surface effect ship of claim 1 wherein water contacting portions of said port and starboard bow members extend forward of an average of longitudinal positions of forward water contacting portions of the gas cushion forward seal member by at least twenty-five percent of a waterline length of the improved surface effect ship.

8. The improved surface effect ship of claim 1 wherein forward water contacting portions of said port and starboard bow members further comprise artificially pressurized gas cushion portions disposed in their undersides.

9. The improved surface effect ship of claim 1 wherein the artificially pressurized gas cushion portions disposed in the undersides of the port and starboard bow members extend forward of an average of longitudinal positions of forward water contacting portions of the gas cushion forward seal member.

10. The improved surface effect ship of claim 9 wherein the artificially pressurized gas cushion portions disposed in the undersides of the port and starboard bow members extend forward of an average of longitudinal positions of forward water contacting portions of the gas cushion forward seal member by at least five percent of a waterline length of the improved surface effect ship.

11. The improved surface effect ship of claim 9 wherein the artificially pressurized gas cushion portions disposed in the undersides of the port and starboard bow members extend forward of an average of longitudinal positions of forward water contacting portions of the gas cushion forward seal member by at least ten percent of a waterline length of the improved surface effect ship.

12. The improved surface effect ship of claim 9 wherein the gas cushion portions disposed in the undersides of the port and starboard bow members diverge either side of vertical sidehull longitudinal planes going aft from their forward portions.

13. The improved surface effect ship of claim 12 wherein said vertical longitudinal planes are vertical longitudinal centerline planes of the port and starboard sidehulls.

14. The improved surface effect ship of claim 1 wherein said gas cushion forward seal member disposed between the port and starboard sidehulls extends over less than twenty percent of an overall width of the improved surface effect ship.

15. The improved surface effect ship of claim 1 wherein the gas cushion forward seal member is less than twenty percent of a width of the improved surface effect ship.

16. The improved surface effect ship of claim 1 wherein said gas cushion forward seal member disposed between the port and starboard bow members extends over less than twenty-five percent of an overall width of the improved surface effect ship.

17. The improved surface effect ship of claim 1 wherein said gas cushion forward seal member disposed between the port and starboard bow members extends over less than thirty percent of an overall width of the unproved surface effect ship.

18. The improved surface effect ship of claim 1 wherein said gas cushion forward seal member disposed between the port and starboard bow members extends over less than thirty-five percent of an overall width of the improved surface effect ship.

19. The improved surface effect ship of claim 1 wherein said gas cushion forward seal member disposed between the port and starboard bow members extends over less than forty percent of an overall width of the improved surface effect ship.

20. The improved surface effect ship of claim 1 wherein said gas cushion forward seal member disposed between the port and starboard bow members extends over less than fifty percent of an overall width of the improved surface effect ship.

21. The improved surface effect ship of claim 1 wherein the forward gas cushion seal is rigid and connects the port and starboard sidehulls.

22. The improved surface effect ship of claim 1 wherein longitudinally oriented fluid fences extend downward from upper surfaces of the gas cushion recess to thereby restrict fluid flow in the gas cushion.

23. The improved surface effect ship of claim 22 wherein said fluid fences are not in contact with a water surface over a majority of their length.

24. The improved surface effect ship of claim 1 wherein the port and starboard bow members diverge either side of vertical sidehull longitudinal planes going aft from forward portions of their bows.

25. The improved surface effect ship of claim 24 wherein said vertical sidehull longitudinal planes are vertical sidehull centerline planes of the port and starboard sidehulls.

26. The improved surface effect ship of claim 1 wherein a gas cushion aft seal member, as seen in a vertical transverse plane of the improved surface effect ship, comprises at least two inverted-V shaped portions.

27. The improved surface effect ship of claim 1 wherein a gas cushion aft seal member, as seen in a vertical transverse plane of the improved surface effect ship, is angled to horizontal over a majority of its width.

28. The improved surface effect ship of claim 1 wherein pressurized gas is discharged into the gas cushion proximal an aft end of a gas cushion forward seal.

29. The improved surface effect ship of claim 28 wherein pressurized gas discharged into the gas cushion proximal an aft end of a gas cushion forward seal is made up of more than fifty percent dynamic pressure to thereby form a dynamic gas seal that aids in restricting pressurized gas from escaping from the gas cushion.

30. The improved surface effect ship of claim 28 wherein pressurized gas discharged into the gas cushion proximal an aft end of a gas cushion forward seal is made up of more than seventy-five percent dynamic pressure to thereby form a dynamic gas seal that aids in restricting pressurized gas from escaping from the gas cushion.

31. The improved surface effect ship of claim 28 wherein pressurized gas discharged into the gas cushion proximal an aft end of a gas cushion forward seal is made up of more than ninety percent dynamic pressure to thereby form a dynamic gas seal that aids in restricting pressurized gas from escaping from the gas cushion.

32. The improved surface effect ship of claim 28 wherein pressurized gas discharged into the gas cushion proximal an aft end of a gas cushion forward seal at an average velocity of more than 20,000 feet per minute such that discharge velocity of the pressured gas discharged into the gas cushion is sufficiently high to form a gas seal thereby restricting pressurized gas from escaping from the gas cushion.

33. The improved surface effect ship of claim 1 wherein there is a third bow member disposed inboard of the port and starboard bow members.

34. The improved surface effect ship of claim 1 wherein there is a third bow member and wherein gas cushion forward seal members are disposed between port and starboard bow members and the third bow member.

35. The improved surface effect ship of claim 1 wherein said improved surface effect ship is running at a bow up trim angle of less than five degrees.

36. The improved surface effect ship of claim 1 wherein said improved surface effect ship is running at a bow up trim angle of less than two and one-half degrees.

37. In an improved surface effect ship wherein said improved surface effect ship includes a port sidehull having a port bow member and starboard sidehull having a starboard bow member and is supported upon a water surface in part by at least one artificially pressurized gas cushion, the improvement comprising:

a gas cushion forward seal member disposed, at least in its majority, between said port and starboard bow members and wherein said forward seal member is at least in its majority non-moveable in relation to the improved surface effect ship and wherein pressurized gas is discharged rearward into the gas cushion from proximal an aft lower portion of the gas cushion forward seal member to thereby create a pressurized gas seal and wherein said gas cushion forward seal member is no more than fifty percent of a width of the improved surface effect ship.

38. The improved surface effect ship of claim 37 wherein said gas cushion forward seal member is no more than forty percent of a width of the improved surface effect ship.

39. The improved surface effect ship of claim 37 wherein said gas cushion forward seal member is no more than thirty-five percent of a width of the improved surface effect ship.

40. The improved surface effect ship of claim 37 wherein said gas cushion forward seal member is no more than thirty percent of a width of the improved surface effect ship.

41. The improved surface effect ship of claim 37 wherein said gas cushion forward seal member is no more than twenty-five percent of a width of the improved surface effect ship.

42. The improved surface effect ship of claim 37 wherein said gas cushion forward seal member is no more than twenty percent of a width of the improved surface effect ship.

43. The improved surface effect ship of claim 37 wherein water contacting portions of said port and starboard bow members extend, as seen when the improved surface effect ship is moving forward at high speed in a calm sea with its gas cushion pressurized, forward of an average of longitudinal positions of water contacting portions of the gas cushion forward seal member by at least five percent of a waterline length of the improved surface effect ship.

44. The improved surface effect ship of claim 37 wherein water contacting portions of said port and starboard bow members extend, as seen when the improved surface effect ship is moving forward at high speed in a calm sea with its gas cushion pressurized, forward of an average of longitudinal positions of water contacting portions of the gas cushion forward seal member by at least ten percent of a waterline length of the improved surface effect ship.

45. The improved surface effect ship of claim 37 wherein water contacting portions of said port and starboard bow members extend, as seen when the improved surface effect ship is moving forward at high speed in a calm sea with its gas cushion pressurized, forward of an average of longitudinal positions of water contacting portions of the gas cushion forward seal member by at least fifteen percent of a waterline length of the improved surface effect ship.

46. The improved surface effect ship of claim 37 wherein water contacting portions of said port and starboard bow members extend, as seen when the improved surface effect ship is moving forward at high speed in a calm sea with its gas cushion pressurized, forward of an average of longitudinal positions of water contacting portions of the gas cushion forward seal member by at least twenty percent of a waterline length of the improved surface effect ship.

47. The improved surface effect ship of claim 37 wherein water contacting portions of said port and starboard bow members extend, as seen when the improved surface effect ship is moving forward at high speed in a calm sea with its gas cushion pressurized, forward of an average of longitudinal positions of water contacting portions of the gas cushion forward seal member by at least twenty-five percent of a waterline length of the improved surface effect ship.

48. The improved surface effect ship of claim 37 wherein forward water contacting portions of said port and starboard bow members, as seen when the improved surface effect ship is moving forward at high speed in a calm sea with its gas cushion pressurized, further comprise artificially pressurized gas cushion portions disposed in their undersides.

49. The improved surface effect ship of claim 48 wherein the artificially pressurized gas cushion portions disposed in the undersides of the port and starboard bow members extend, as seen when the improved surface effect ship is moving forward at high speed in a calm sea with its gas cushion pressurized, forward of an average of longitudinal positions of forward water contacting portions of the gas cushion forward seal member by at least five percent of a waterline length of the improved surface effect ship.

50. The improved surface effect ship of claim 48 wherein the artificially pressurized gas cushion portions disposed in the undersides of the port and starboard bow members extend, as seen when the improved surface effect ship is moving forward at high speed in a calm sea with its gas cushion pressurized, forward of an average of longitudinal positions of forward water contacting portions of the gas cushion forward seal member by at least ten percent of a waterline length of the improved surface effect ship.

51. The improved surface effect ship of claim 48 wherein the gas cushion portions disposed in the undersides of the port and starboard bow members diverge either side of vertical sidehull longitudinal planes going aft from their forward portions.

52. The improved surface effect ship of claim 51 wherein said vertical longitudinal planes are vertical longitudinal centerline planes of the port and starboard sidehulls.

53. The improved surface effect ship of claim 37 wherein inboard portions of the port and starboard sidehulls are at least partially truncated aft of their bow portions.

54. The improved surface effect ship of claim 37 wherein longitudinally oriented fluid fences extend downward from upper surfaces of the gas cushion recess to thereby restrict fluid flow in the gas cushion.

55. The improved surface effect ship of claim 54 wherein, when the improved surface effect ship is moving forward at high speed in a calm sea with its gas cushion pressurized, said fluid fences are not in contact with a water surface over a majority of their length.

56. The improved surface effect ship of claim 37 wherein a gas cushion aft seal member, as seen in a vertical transverse plane of the improved surface effect ship, comprises at least two inverted-V shaped portions.

57. The improved surface effect ship of claim 37 wherein a gas cushion aft seal member, as seen in a vertical transverse plane of the improved surface effect ship, is angled to horizontal over a majority of its width.

58. The improved surface effect ship of claim 37 wherein pressurized gas is discharged into the gas cushion proximal an aft end of a gas cushion forward seal is made up of more than fifty percent dynamic pressure to thereby form a dynamic gas seal that aids in restricting pressurized gas from escaping forward from the gas cushion.

59. The improved surface effect ship of claim 37 wherein pressurized gas is discharged into the gas cushion proximal an aft end of a gas cushion forward seal is made up of more than seventy-five percent dynamic pressure to thereby form a dynamic gas seal that aids in restricting pressurized gas from escaping from the gas cushion.

60. The improved surface effect ship of claim 37 wherein pressurized gas is discharged into the gas cushion proximal an aft end of a gas cushion forward seal is made up of more than ninety percent dynamic pressure to thereby form a dynamic gas seal that aids in restricting pressurized gas from escaping from the gas cushion.

61. The improved surface effect ship of claim 37 wherein pressurized gas is discharged into the gas cushion proximal an aft end of a gas cushion forward seal at an average velocity of more than 20,000 feet per minute such that discharge velocity of the pressured gas discharged into the gas cushion is sufficiently high to form a gas seal thereby restricting pressurized gas from escaping from the gas cushion.

62. The improved surface effect ship of claim 37 which further comprises a third bow member disposed at least in its majority between the port and starboard bow members.

63. The improved surface effect ship of claim 37 which further comprises a third bow member and wherein gas cushion forward seal members are disposed between the port and starboard bow members and the third bow member.

64. The improved surface effect ship of claim 37 wherein said improved surface effect ship is running at a bow up trim angle of less than five degrees.

65. The improved surface effect ship of claim 37 wherein said improved surface effect ship is running at a bow up trim angle of less than two and one-half degrees.

66. In an improved surface effect ship wherein said improved surface effect ship includes a port sidehull having a port bow member and a starboard sidehull having a starboard bow member and is supported upon a water surface in part by at least one artificially pressurized gas cushion, the improvement comprising:
 a third hull member disposed at least in part between the said port and starboard sidehull bow members wherein gas cushion forward seal members are disposed, at least in part, between the port sidehull bow and the third hull member and between the starboard sidehull bow and the third hull member and wherein at least a majority of said forward seal members are non moveable in relation to said improved surface effect ship.

67. The improved surface effect ship of claim 66 wherein pressurized gas is discharged into the gas cushion from proximal aft ends of the gas cushion forward seal members.

68. The improved surface effect ship of claim 67 wherein pressurized gas discharged into the gas cushion proximal an aft end of a gas cushion forward seal is made up of more than fifty percent dynamic pressure to thereby form a dynamic gas seal that aids in restricting pressurized gas from escaping from the gas cushion.

69. The improved surface effect ship of claim 67 wherein pressurized gas discharged into the gas cushion proximal an aft end of a gas cushion forward seal is made up of more than seventy-five percent dynamic pressure to thereby form a dynamic gas seal that aids in restricting pressurized gas from escaping from the gas cushion.

70. The improved surface effect ship of claim 67 wherein pressurized gas discharged into the gas cushion proximal an aft end of a gas cushion forward seal is made up of more than ninety percent dynamic pressure to thereby form a dynamic gas seal that aids in restricting pressurized gas from escaping forward from the gas cushion.

71. The improved surface effect ship of claim 67 wherein the pressurized gas discharged into the gas cushion from proximal aft ends of the gas cushion forward seal members is discharged into the gas cushion at average velocities of more than 20,000 feet per minute such that discharge velocity of the pressured gas discharged into the gas cushion is sufficiently high to form a gas seal thereby restricting pressurized gas from escaping from the gas cushion.

72. The improved surface effect ship of claim 66 wherein the gas cushion forward seals, as seen in vertical transverse planes of the improved surface effect ship, are angled to horizontal over a majority of their width.

73. The improved surface effect ship of claim 66 wherein inboard portions of the port and starboard sidehulls are at least partially truncated aft of their bow portions.

74. The improved surface effect ship of claim 66 wherein longitudinally oriented fluid fences extend downward from upper surfaces of the gas cushion recess to thereby restrict fluid flow in the gas cushion.

75. The improved surface effect ship of claim 66 wherein forward water contacting portions of said port and starboard bow members further comprise artificially pressurized gas cushion portions disposed in their undersides.

76. In an improved surface effect ship wherein said improved surface effect ship includes port sidehull having a port bow member and a starboard sidehull having a starboard bow member and is supported upon a water surface in part by at least one artificially pressurized gas cushion, the improvement comprising:

a gas cushion forward seal member disposed, at least in its majority, between said port and starboard bow members and wherein pressurized gas discharged into the gas cushion proximal an aft end of the gas cushion forward seal member is made up of more than fifty percent dynamic pressure to thereby form a dynamic gas seal that aids in restricting pressurized gas from escaping from the gas cushion and wherein said gas cushion forward seal member is, at least in its majority made up of rigid materials.

77. The improved surface effect ship of claim 76 wherein pressurized gas discharged into the gas cushion proximal an aft end of the gas cushion forward seal member is made up of more than seventy-five percent dynamic pressure to thereby form a dynamic gas seal that aids in restricting pressurized gas from escaping from the gas cushion.

78. The improved surface effect ship of claim 76 wherein pressurized gas discharged into the gas cushion proximal an aft end of the gas cushion forward seal member is made up of more than ninety percent dynamic pressure to thereby form a dynamic gas seal that aids in restricting pressurized gas from escaping from the gas cushion.

79. The improved surface effect ship of claim 76 wherein inboard sidewalls bordering the gas cushion of said improved surface effect ship are, at least in their majority, aft of the gas cushion forward seal member.

* * * * *